US011114861B2

(12) United States Patent
Rooymans

(10) Patent No.: US 11,114,861 B2
(45) Date of Patent: Sep. 7, 2021

(54) POWER OPTIMIZATION FOR BATTERY POWERED STREET LIGHTING SYSTEM

(71) Applicant: Gemex Consultancy B.V., Oss (NL)

(72) Inventor: Johannes Otto Rooymans, Oss (NL)

(73) Assignee: Euro Sino Optical Research and Development Centre B.V, Oss (NL)

( * ) Notice: Subject to any disclaimer, the term of this patent is extended or adjusted under 35 U.S.C. 154(b) by 294 days.

(21) Appl. No.: 15/532,546

(22) PCT Filed: Dec. 4, 2015

(86) PCT No.: PCT/NL2015/050842
§ 371 (c)(1),
(2) Date: Jun. 2, 2017

(87) PCT Pub. No.: WO2016/089210
PCT Pub. Date: Jun. 9, 2016

(65) Prior Publication Data
US 2017/0367153 A1 Dec. 21, 2017

(30) Foreign Application Priority Data
Dec. 5, 2014 (NL) ......................................... 2013929

(51) Int. Cl.
*H05B 33/08* (2020.01)
*H02J 7/00* (2006.01)
(Continued)

(52) U.S. Cl.
CPC .............. *H02J 3/383* (2013.01); *H02J 3/382* (2013.01); *H02J 3/386* (2013.01); *H02J 7/0019* (2013.01);
(Continued)

(58) Field of Classification Search
CPC .. H02J 3/382; H02J 7/00; H02J 7/0068; H02J 9/00; H02J 3/383; H02J 7/35;
(Continued)

(56) References Cited

U.S. PATENT DOCUMENTS 7,021,787 B1 * 4/2006 Kuelbs ..................... A45B 3/04
362/183
2005/0184674 A1 * 8/2005 Kaler ................... B65H 75/364
315/169.3

(Continued)

FOREIGN PATENT DOCUMENTS

| CN | 1290405 A | 4/2001 |
| DE | 29918504 U1 | 3/2001 |

(Continued)

*Primary Examiner* — Toan T Vu
(74) *Attorney, Agent, or Firm* — N.V. Nederlandsch Octrooibureau; Catherine A. Shultz; Katelyn J. Bernier

(57) ABSTRACT

A network is disclosed of a plurality of outdoor lighting units. Each lighting unit comprises a light fixture, for example a LED lamp; a power generating means, such as a solar panel or a wind turbine; and a storage means for electric energy, for example a battery.
The energy storage means of neighboring lighting units are connected by a conductor. An imbalance in power generation or power consumption results in a balancing current through the conductor. The balancing current equalizes the charge levels of the energy storage means in the system.
In an embodiment the conductor comprises a single core wire and ground.

14 Claims, 3 Drawing Sheets

(51) Int. Cl.
*H02J 3/38* (2006.01)
*H02J 7/35* (2006.01)
*H05B 47/10* (2020.01)

(52) U.S. Cl.
CPC .............. *H02J 7/0068* (2013.01); *H02J 7/35* (2013.01); *H05B 47/10* (2020.01); *Y02B 20/72* (2013.01); *Y02E 10/56* (2013.01); *Y02E 10/76* (2013.01)

(58) Field of Classification Search
CPC .......... H02J 7/0019; H02J 3/386; H02J 3/381; H02J 2300/24; H02J 2300/28; H05B 33/0809; H05B 37/00; H05B 47/10; H05B 47/00; H05B 45/37; Y02E 10/56; Y02E 10/76; Y02B 20/72
USPC ...... 307/19; 315/32, 55, 149, 151, 160, 161; 362/1, 11, 18, 84, 157, 227, 249.02, 552, 362/555
See application file for complete search history.

(56) References Cited

U.S. PATENT DOCUMENTS

| | | | |
|---|---|---|---|
| 2010/0097001 A1* | 4/2010 | Kuo | H05B 33/0809 315/210 |
| 2011/0248835 A1* | 10/2011 | Speegle | H05B 47/185 340/12.32 |
| 2012/0127621 A1* | 5/2012 | Knapp, Jr. | H02H 3/093 361/94 |
| 2012/0143383 A1* | 6/2012 | Cooperrider | H05B 47/105 700/295 |
| 2013/0113379 A1* | 5/2013 | Pennisi | H02J 3/383 315/121 |
| 2013/0127423 A1* | 5/2013 | Liang | H02J 7/0016 320/136 |
| 2014/0077765 A1* | 3/2014 | Gao | H02J 7/00 320/126 |
| 2014/0225533 A1 | 8/2014 | Park et al. | |
| 2014/0277805 A1* | 9/2014 | Browne, Jr. | H05B 37/0272 700/295 |
| 2014/0320029 A1 | 10/2014 | Tyrrell | |
| 2015/0115830 A1* | 4/2015 | Siessegger | H05B 33/0803 315/291 |
| 2015/0147571 A1* | 5/2015 | Alexander | C08L 83/04 428/391 |
| 2016/0018074 A1* | 1/2016 | Diamond | F21V 23/0464 362/183 |

FOREIGN PATENT DOCUMENTS

| | | | |
|---|---|---|---|
| JP | 2004103483 | * | 4/2004 |
| WO | 2013/163350 A1 | | 10/2013 |

\* cited by examiner

POWER OPTIMIZATION FOR BATTERY POWERED STREET LIGHTING SYSTEM

BACKGROUND OF THE INVENTION

1. Field of the Invention

The invention relates generally to a system of stand-alone street lights, and more particularly for a system in which power generated by the individual street lights is shared among the street lights in the system.

2. Description of the Related Art

Renewable energy, such as generated by wind turbines or photovoltaic panels, is increasingly being used for providing outdoor lighting, in particular in areas and applications where connection of the outdoor lighting units to the electric grid is not possible or not convenient.

In one approach a system of outdoor lighting units is powered from a central source of renewable energy, such as an array of photovoltaic panels or a system of one or more wind turbines. In such a system power generation and storage is controlled centrally. Operation of the outdoor light units may be controlled centrally, for example by means of a time clock or a light sensor associated with the central power generation system.

In an alternate approach the lighting units of the system each have a power generation device and an energy storage device, for example a small solar panel and a battery.

Systems have been disclosed for allowing communication of outdoor lights with a central controller. U.S. Pat. No. 8,588,830 discloses a wireless and intelligent monitoring and control system for outdoor lights.

U.S. Pat. No. 7,976,180 B1 discloses a solar powered rechargeable street light, which can be networked to a system. The system can be powered from a central controller, which can detect tampering by individuals or harsh weather conditions.

US Patent Application Publication 2014/0225533 discloses a control system that integratedly manages a plurality of solar cell lighting apparatuses. It includes a main control unit to collect charge capacity information of each of the secondary batteries included in the system. It controls light intensity to achieve charge capacity balancing of the secondary batteries.

Prior art computer based control systems tend to be prohibitively expensive for implementation in developing countries. Even in developed countries the savings achieved with such systems do not always justify the cost of building and maintaining such systems.

Thus, there is a need for a low cost system for optimizing power use of an outdoor lighting system

BRIEF SUMMARY OF THE INVENTION

The present invention addresses these problems by providing a network of a plurality of outdoor lighting units, each unit comprising:
a. a light fixture;
b. a power generating means;
c. a storage means for electric energy;
wherein the storage means of neighboring lighting units are connected by a conductor.

The storage means provides an operating voltage that varies with the amount of stored energy. For example, a rechargeable battery having a nominal operating voltage of 24 Volts may have an actual operating voltage of about 26 Volts when fully charged and an actual operating voltage of about 22 Volts when its charge is near 10% of its full capacity. Because the storage means of neighboring outdoor lighting units are connected by a conductor, if two neighboring storage means are unequally charged current will flow from the storage means with the greater charge to the storage means with the lesser charge, until both are equally charged.

Importantly, this charge equalization makes use of an inherent property of the storage means, and does not require a monitoring system or controller of any kind.

BRIEF DESCRIPTION OF THE FIGURES

The invention will be described with reference to the figures of which.

DETAILED DESCRIPTION OF THE INVENTION

Figure 1:
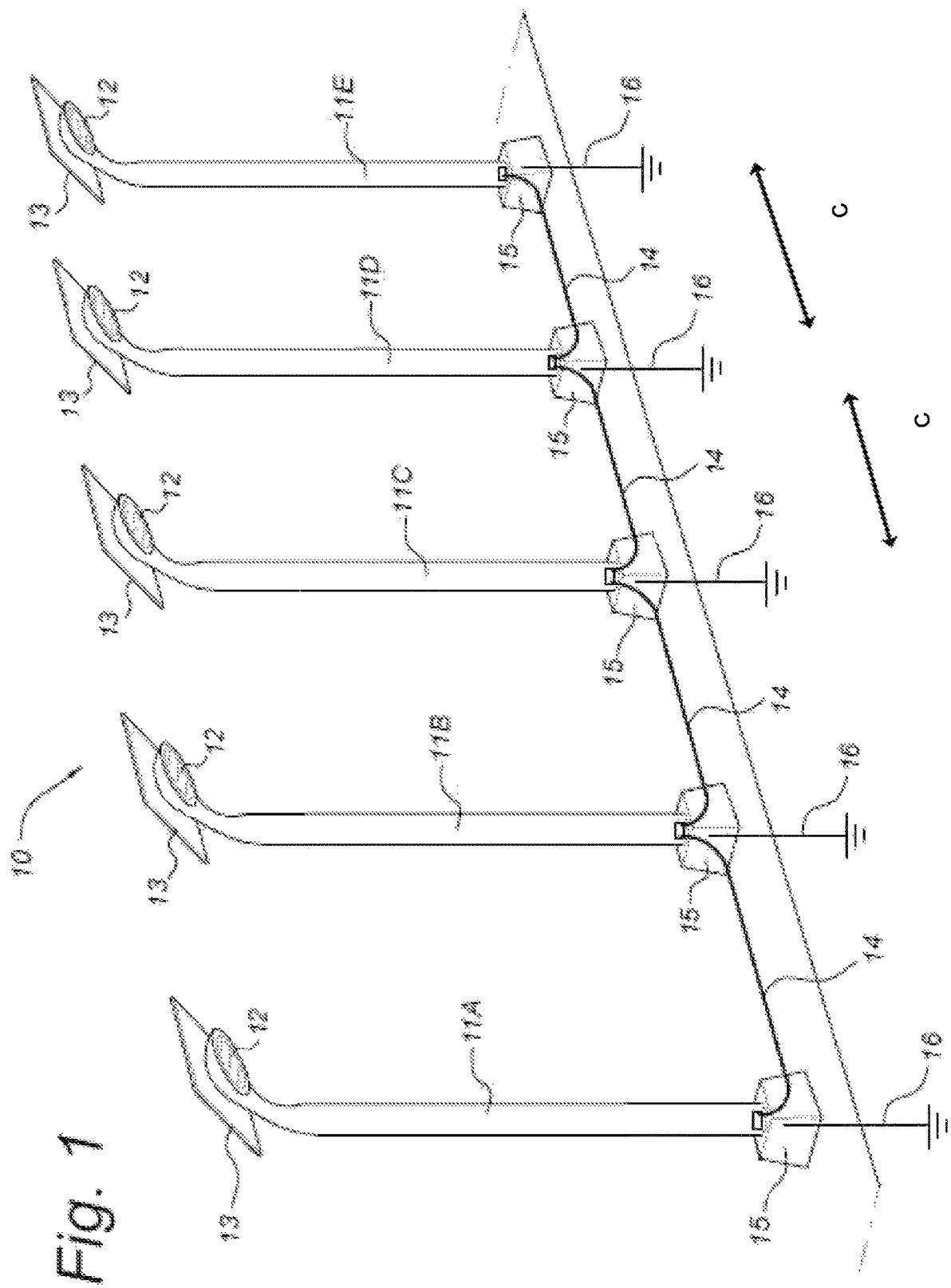
FIG. 1 is a schematic representation of (part of) a system of the invention.

The following is a detailed description of the invention.

In its broadest aspect the present invention relates to a network of a plurality of outdoor lighting units, each unit comprising:
a. a light fixture;
b. a power generating means;
c. a storage means for electric energy;
wherein the storage means of neighboring lighting units are connected by a conductor.

The light fixture preferably is of an energy efficient type, such as a fluorescent light bulb or an array of light emitting diodes (LEDs).

The power generating means can be any type of power generating device. Power generating devices that convert renewable energy to electric energy are preferred. Examples include small wind turbines and small arrays of solar cells. The power generating capacity of the power generating means may be matched to the power consumption of the light fixture. It will be understood that the capacity of the power generating means is desirably selected to exceed the power consumption of the light fixture, so as to provide extra power that may be stored for use when power generation is lower than usual (cloudy days, in the case of solar panels, or windless days in the case of wind turbines).

The storage means for electric energy may be any means capable of repeatedly storing and releasing electric energy. Examples include capacitors and rechargeable batteries. Combinations of capacitors and rechargeable batteries may also be used. Examples of suitable rechargeable batteries include Lithium Iron Phosphate known as LiFePO 4, Lithium ion batteries or Lithium/air batteries. The choice of the most appropriate storage means will generally be based on considerations such as cost, weight, durability, maintenance requirements, and the like. It is important, however, that the storage means provide an operating voltage that varies in function of the charge level of the storage means. Preferably this voltage variation is kept within a relatively narrow window, for example between +10% and −10% of a nominal voltage rating of the storage means. For example, a battery having a nominal voltage rating of 24 Volts may provide an operating voltage of up to 26.4 Volts when fully charged, and an operating voltage of 21.6 Volts when the charge level drops to an acceptable minimum level, for example 10% or 20% of full storage capacity.

Draining a battery to levels below a critical level, for example 10% or 20% of the full charge capacity, can dramatically decrease the lifespan of specific batteries. The lighting unit may contain a circuit that prevents draining the battery beyond a predetermined level, for example in response to a drop in the operating voltage below a predetermined level.

It will be understood that each lighting unit can function in a stand-alone mode, so that it can function even when the conductor connecting the lighting unit to a neighboring lighting unit is disconnected, for example as a result of tampering, a mishap, or weather conditions. Each lighting unit may comprise additional components, such as a LED driver, a time clock, an ambient light sensor, one or more current PTC fuses, and the like.

The conductor connecting the storage means of two neighboring lighting units serves to equalize the charge levels of the two storage means. If one of the storage means has a higher charge level than its neighbor, its operating voltage will likewise be higher than that of its neighbor. Current will flow through the conductor from the storage means with the higher charge level to the storage means with the lower charge level, until the two charge levels are equalized. Because all lighting units are connected to all other lighting units of the system, this process will take place between all sets of neighboring storage means until they all have equal charge.

The advantages of the invention can be illustrated with reference to a system of lighting units powered by solar panels and equipped with batteries as storage means. At a given time during the day, individual solar panels within the system may be generating different amounts of power, as some solar panels may receive full sunshine, while others are in the shade of a building or a tree, and yet others may be partially covered with dirt or dust. If all lighting units were fully independent, a solar cell operating at full capacity would fully charge its associated battery. Any additional energy generated by the solar panel would be wasted, because there would be no further means to store it. At the same time other lighting units nearby might end the day with batteries that are less than fully charged, because their solar panels were in the shade for part of the day.

During the night the battery power of all units would be drained at equal rate. The batteries that were not fully charged will be drained more deeply during the night, which negatively affects the life expectance of these batteries.

In the system of the present invention the more productive solar panels share part of their generated energy with neighboring units, which may in turn share it with their neighbors, etc. As a result better use is made of the power generated by all solar panels, and the average charge level of all batteries at the end of the solar day is higher. Batteries are less frequently discharged to the lowest acceptable level, which prolongs their useful life.

The conductor connecting the storage means of neighboring light units may be any acceptable electric conductor. Examples include conducting metals, such as aluminum and copper. Copper is generally preferred.

The conductor may comprise a dual-core wire. In an alternate embodiment the conductor may be a single-core wire, with each lighting unit being connected to ground. This latter embodiment offers a number of advantages. The amount of wire needed for the system is much reduced. It eliminates the risk of creating a short circuit when the wire is cut, either accidentally or as the result of tampering. And the earth resistance is a reliable resistance which may vary from less than 1 Ohm to 5 Ohms or more. Over large distances this may reduce the overall resistance of the system. Illegal tapping of energy is made more difficult, because the thief can only use the energy with access to a suitable ground connection. An increasing global problem is the theft of copper wire as valuable metal. By using earth as one of the conductors the use of copper is reduced by half.

The cost of the conductor can be very low, because they carry rather small amounts of energy at modest voltage. The conductor may be above ground, or buried (preferred).

Energy losses can be kept relatively modest, as can be illustrated with the following example. Suppose the wire of the system has a resistance of 20 Ohms. This corresponds to a copper wire having a diameter of 1 mm and a length of more than 800 meters. The resistance of the "second wire" (earth) is 5 Ohms, putting the total resistance of the system at 25 Ohms. If the voltage difference ΔV across the system is 2.5 Volts, the balancing current is 100 mA. The ohmic losses are $I^2R$=0.25 Watts. At 24 Volts the energy being balanced is 24×0.1=2.4 VA=2.4 Watts. The ohmic losses are 0.25/2.4=10.4%. Since without energy balancing the 2.4 Watts would be lost, the net gain is 2.15 Watts.

It may be desirable to limit the current in the system, for example by using a PTC fuse. The current in the system may be limited to 1 A, for example, which is sufficient to deal with rather extreme charge levels between neighboring storage means. A current limit of 1 A makes the system unattractive for energy tapping, as the maximum amount of power that could be diverted is 24 Watts.

It could happen that interconnecting wires get cut or damaged. It will not affect the system catastrophically. In such case blank wire ends will not cause any leakage of energy since the wire contact resistance with ground is very high. The network will still balance the energy between remaining clusters.

If desired the conductor can be used for communication between lighting units. Digital information can be transmitted over the conductor for example by means of pulse modulation. The pulse modulation can be used for dimming or switching to facilitate power management control over various clusters of the network.

DESCRIPTION OF ILLUSTRATIVE EMBODIMENTS/EXAMPLES

The following is a description of certain embodiments of the invention, given by way of example only.

FIG. 1 is a schematic representation of a system 10 of the invention, or part of such a system. The system comprises lighting units 11A through 11E, each comprising a light fixture and a battery contained in hood 12. Each unit further comprises a solar panel 13. Neighboring lighting units are connected by conductors 14.

The individual lighting units are each anchored in a concrete block 15 (only shown for unit 11A), and steel grounds 16.

Figure 2:
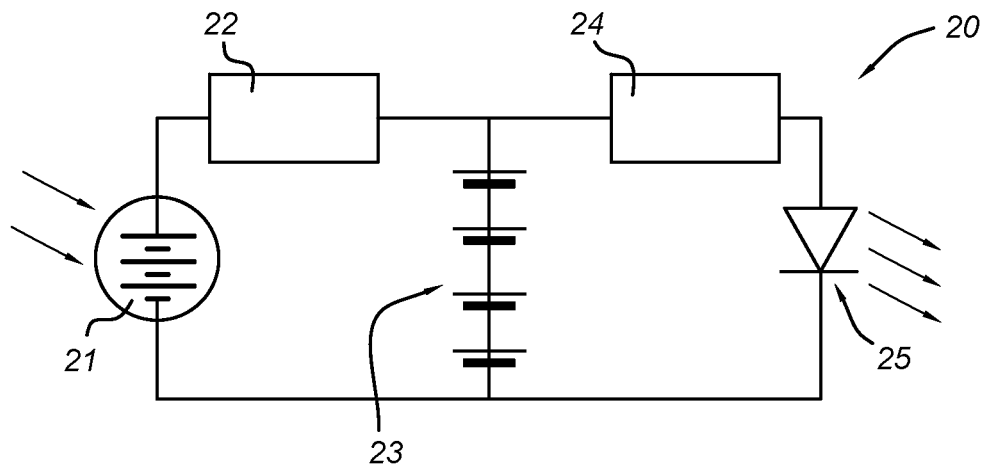
FIG. 2 presents a circuit of an exemplary lighting unit comprising a solar panel and a LED light fixture.

FIG. 2 shows a circuit 20 of an exemplary lighting system. Circuit 20 comprises a solar panel 21, which is controlled by solar controller 22. Energy from solar panel 21 is stored in battery 23. Battery 23 powers LED lamp 25 via LED driver 24.

Figure 3:
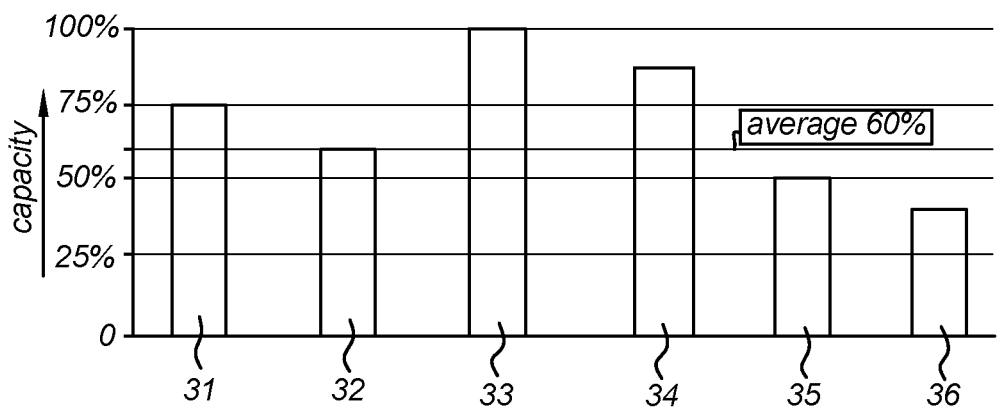
FIG. 3 shows savings as can be obtained with the energy balancing system.

FIG. 3 shows an example of the savings that can be obtained with the system of the invention. FIG. 3 shows the charge stages of lighting units 31 through 36. The charge stages vary from 40% to 100% of capacity, the average being 60%.

In connected mode, the system could store all available energy if each unit had storage capacity of 60% of the storage capacity of fully independent units. By connecting the storage means of the units the storage capacity of each unit could be reduced by 40% while maintaining the total energy stored in the system.

Figure 4:
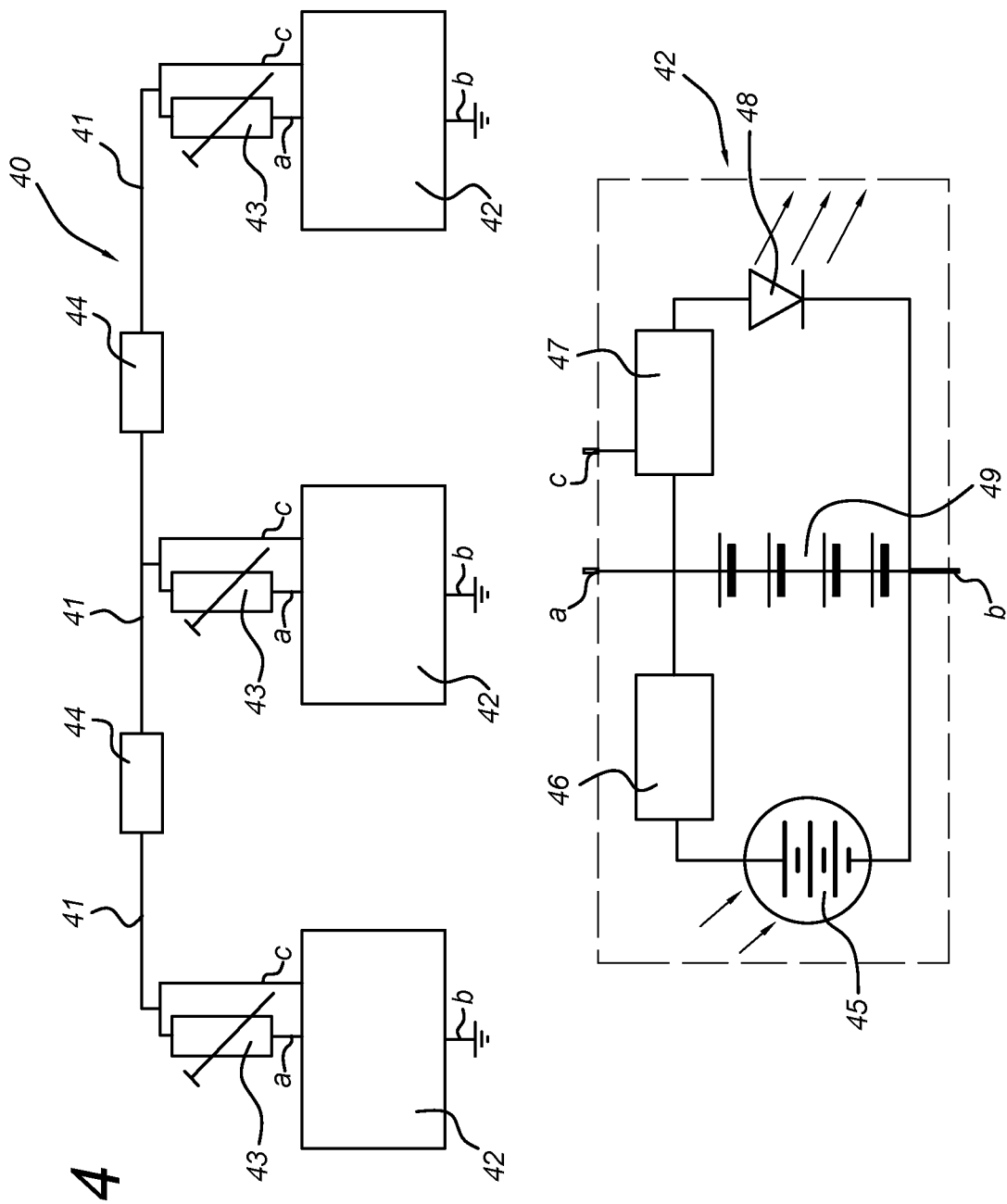
FIG. 4 is a schematic representation of a system comprising dim control communication.

FIG. 4 shows a network 40 comprising a plurality of outdoor lighting units 42 (three such lighting units are shown in FIG. 4 by way of illustration). Neighboring lighting units are interconnected by conductor 41. Conductor 41 comprises RL 44 representing the wire and ground resistance. The resistance of the 43 enables to tap pulse modulation signaling via conductor 41.

Outdoor lighting units 42 are each connected to conductor 41 via a positive temperature coefficient (PTC) fuse 43.

The lower portion of FIG. 4 shows a schematic of a lighting unit 42. Each lighting unit 42 comprises a solar panel 45, a solar controller 46, a LED driver 46, a lamp 48, and a battery 49. LED driver 47 comprises a dim controller.

LED driver 47 is connected to conductor 41 via connector c. LED driver 47 is configured to receive signals C communicated over conductor 41, for example by means of pulse modulation. Signals received in LED driver 47 may instruct LED driver 47 to change the setting of its dim controller, for example.

Thus, the invention has been described by reference to certain embodiments discussed above. It will be recognized that these embodiments are susceptible to various modifications and alternative forms well known to those of skill in the art.

Many modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A network of a plurality of outdoor lighting units, each unit comprising:
   a. a light fixture;
   b. a power generating means;
   c. a storage means for electric energy; and
   d. a connection to ground;
   wherein neighboring lighting units are distanced from each other with an amount of ground therebetween and the storage means of neighboring lighting units are connected by a conductor that consists of a wire and a connection through the ground;
   wherein the conductor serves to conduct electric energy from a first storage means of a first lighting unit to a second storage means of a second lighting unit by conduction through the ground between the lighting units, so as to balance charge states of the first storage means and the second storage means; and
   wherein each lighting unit further comprises a controller configured to receive signals over the conductor, and each lighting unit is adapted to additionally communicate with a neighboring lighting unit via the conductor.

2. The network of claim 1 wherein the light fixture comprises LED light sources.

3. The network of claim 1 wherein the power generating means comprises (i) a solar panel; (ii) a wind turbine; or (iii) a combination thereof.

4. The network of claim 1, wherein the storage means for electric energy comprises a rechargeable battery.

5. The network of claim 1, wherein the single wire comprises a double core electric wire.

6. The network of claim 1, wherein charge states are balanced as a result of a difference in operating voltage of electric energy storage means of neighboring lighting units.

7. The network of claim 6, wherein the conductor connecting the storage means of neighboring lighting units to perform charge state balancing does not comprise a controller.

8. The network of claim 1, wherein the conductor comprises a means for detecting a current exceeding a predetermined threshold value.

9. The network of claim 1, wherein the outdoor lighting units are self-sufficient.

10. The network of claim 1, wherein the power of the power generating means is supplemented with power from an external source.

11. The network of claim 1, wherein the lighting units are connected to the conductor by a PTC fuse.

12. The network of claim 1, wherein each lighting unit further comprises an LED driver having a dim controller, and the LED driver is configured to receive signals communicated over the conductor by pulse modulation.

13. A network of a plurality of outdoor lighting units, each unit comprising:
   a light fixture,
   a power generating means,
   a storage means for electric energy, and
   a connection to ground;
   wherein neighboring lighting units are distanced from each other with an amount of ground therebetween and the storage means of neighboring lighting units are connected by a conductor that consists of a wire and a connection through the ground;
   wherein the conductor conducts electric energy from a first storage means of a first lighting unit to a second storage means of a second lighting unit by conduction through the ground between the lighting units to balance charge states of the first storage means and the second storage means; and
   wherein each lighting unit comprises a controller configured to receive signals over the conductor, a driver connected to the conductor that is configured to receive signals communicated over the conductor, and each lighting unit is adapted to additionally communicate with a neighboring lighting unit via the conductor.

14. A network of a plurality of outdoor lighting units, each unit comprising:
   a light fixture,
   a power generating means,
   a storage means for electric energy, and
   a connection to ground;
   wherein neighboring lighting units are distanced from each other with an amount of ground therebetween and the storage means of neighboring lighting units are connected by a conductor that consists of a wire and a connection through the ground;
   wherein the conductor is arranged to conduct electric energy from a first storage means of a first lighting unit to a second storage means of a second lighting unit by conduction through the ground between the lighting units in order to balance charge states of the first storage means and the second storage means;

wherein each lighting unit comprises a controller configured to receive signals over the conductor and is further configured to transmit digital information over the conductor and/or to communicate with a neighboring lighting unit via the conductor by pulse modulation; and wherein each lighting unit is adapted to additionally communicate with a neighboring lighting unit via the conductor.

\* \* \* \* \*